(12) United States Patent
van den Broeke

(10) Patent No.: US 8,981,740 B2
(45) Date of Patent: Mar. 17, 2015

(54) SWITCHING CIRCUIT

(75) Inventor: Leendert Albertus Dick van den Broeke, Malden (NL)

(73) Assignee: NXP B.V., Eindhoven (NL)

( * ) Notice: Subject to any disclaimer, the term of this patent is extended or adjusted under 35 U.S.C. 154(b) by 442 days.

(21) Appl. No.: 13/434,988

(22) Filed: Mar. 30, 2012

(65) Prior Publication Data

US 2012/0256606 A1    Oct. 11, 2012

(30) Foreign Application Priority Data

Apr. 5, 2011  (EP) .................................... 11250426

(51) Int. Cl.
| | | |
|---|---|---|
| G05F 1/577 | (2006.01) | |
| G05F 1/00 | (2006.01) | |
| H02M 3/158 | (2006.01) | |
| H02M 3/335 | (2006.01) | |
| H02M 1/00 | (2006.01) | |

(52) U.S. Cl.
CPC .......... *H02M 3/158* (2013.01); *H02M 3/33561* (2013.01); *H02M 2001/009* (2013.01)
USPC .......................................... 323/267; 323/222

(58) Field of Classification Search
CPC ... H02M 3/155; H02M 3/158; H02M 3/1588; H02M 3/33561; H02M 2001/009
USPC .............. 307/11–42; 323/222, 267, 268, 271, 323/315–317, 282–285
See application file for complete search history.

(56) References Cited

U.S. PATENT DOCUMENTS

| | | | |
|---|---|---|---|
| 6,075,295 A | 6/2000 | Li | |
| 6,222,352 B1 | 4/2001 | Lenk | |
| 6,636,022 B2 | 10/2003 | Sluijs | |
| 6,650,095 B2 | 11/2003 | Aiello et al. | |
| 7,176,661 B2 * | 2/2007 | Kranz | ............................. 323/222 |
| 7,276,886 B2 | 10/2007 | Kinder et al. | |
| 7,298,116 B2 | 11/2007 | Sluijs | |
| 2005/0105227 A1 | 5/2005 | Chen et al. | |
| 2005/0264271 A1 | 12/2005 | Lam et al. | |
| 2009/0040794 A1* | 2/2009 | Williams | ..................... 363/21.14 |
| 2010/0026267 A1* | 2/2010 | Easwaran et al. | .............. 323/288 |
| 2010/0274301 A1* | 10/2010 | Pons | .................................. 607/2 |

(Continued)

OTHER PUBLICATIONS

Ma, D., et al. "Single-Inductor Multiple-Output Switching Converters with Time-Multiplexing Control in Discontinuous Conduction Mode"; IEEE J. Solid-State Circuits, vol. 38, No. 1, pp. 89-100 (Jan. 2003).

(Continued)

*Primary Examiner* — Jessica Han
*Assistant Examiner* — Ivan Laboy Andino

(57) ABSTRACT

A multiple output switching circuit (300) comprising an input (302) configured to receive power from a power source; a first output (304) configured to provide a first output voltage; and an inductor (308) and a power switch (306) connected between the input (302) and first output (304). The power switch (306) is operable to transfer power from the input (302) to the first output (304). The switching circuit further comprising a second output (312) configured to provide a second output voltage; a second switch (310) coupled between the first output (302) and the second output (312); and a second switch controller (314) configured to provide the second switch (310) with a second switch control signal (318) such that power is transferred from the input (302) to the second output (312) when the first output voltage level reaches a first output threshold level.

11 Claims, 5 Drawing Sheets

(56) References Cited

U.S. PATENT DOCUMENTS

Figure 1:
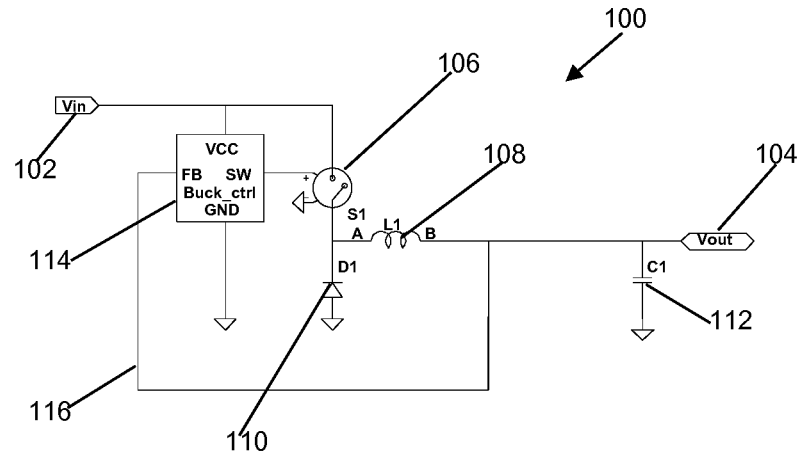

2011/0043181 A1* 2/2011 Jing et al. .................. 323/288
2012/0086426 A1* 4/2012 Smith ........................ 323/311

OTHER PUBLICATIONS

Patra, P., et al. "On-Chip Implementation of a Multi-Output Voltage Regulator Based on Single Inductor Buck Converter Topology"; 20$^{th}$ Int'l. Conf. on VLSI Design 2007; IEEE Computer Society, 6 pgs. (2007).

Lin, R.-L., et al. "Family of Single-Inductor Multi-Output DC-DC Converters"; IEEE Int'l Conf. on Power Electronics and Drive Systems, Nov. 2-5, 2009, pp. 1216-1221 (2009).

Huang, M.-H., et al. "Single-Inductor Multi-Output (SIMO) DC-DC Converters with High Light-Load Efficiency and Minimized Cross-Regulation for Portable Devices"; IEEE J. Solid-State Circuits, vol. 44, No. 4, pp. 1099-1111 (Apr. 2009).

Extended European Search Report for European patent appln. No. 11250426.1 (Sep. 26, 2011).

* cited by examiner

SWITCHING CIRCUIT

CROSS-REFERENCE TO RELATED APPLICATIONS

This application claims the priority under 35 U.S.C. §119 of European patent application no. 11250426.1, filed on Apr. 5, 2011, the contents of which are incorporated by reference herein.

The present disclosure relates to the field of switching circuits, and in particular, although not exclusively to a multiple output switching circuit whereby power is transferred from the input to a second output when a first output voltage level reaches a threshold level.

Switching power converters are known that include one or more inductors. However, inductors can be relatively expensive and occupy a relatively large area on a printed circuit board (PCB). For this reason, various topologies of switching regulators have been developed that use a single inductor to derive multiple output voltages.

The listing or discussion of a prior-published document or any background in the specification should not necessarily be taken as an acknowledgement that the document or background is pad of the state of the ad or is common general knowledge.

According to a first aspect of the invention, there is provided a multiple output switching circuit comprising:
 an input configured to receive power from a power source;
 a first output configured to provide a first output voltage;
 an inductor and a power switch connected between the input and first output; wherein the power switch is operable to transfer power from the input to the first output;
 the switching circuit further comprising:
 a second output configured to provide a second output voltage;
 a second switch coupled between the first output and the second output; and
 a second switch controller configured to provide the second switch with a second switch control signal such that power is transferred from the input to the second output when the first output voltage level reaches a first output threshold level.

Such a switching circuit includes a compact and low-cost addition to a traditional single output switching circuit in order to derive a second output voltage without adding an additional inductor. During a first stage of operation (which may the first pad of the magnetization and possibly demagnetization phase (for Buck converters) or demagnetization phase (for Boost or Flyback converters)), the inductor output current is supplied to the first output. When the first output voltage reaches the first output threshold level, the inductor output current is supplied to the second output. The circuitry to drive the second switch can be implemented using very few components.

The switching circuit may be a boost converter, a buck converter, or a flyback converter, or any other switched mode power supply (SMPS) or power factor correction (PFC) circuit.

The switching circuit may further comprise a first output switch, which in some examples is a diode, that is connected between the first output and the second switch. The first output switch can prevent current from flowing from the first output to the second output when the second switch is closed. In some embodiments, the functionality of the first output switch can be provided by the second switch.

The second switch controller may comprise a comparator configured to compare a signal representative of the voltage level at the first output with a threshold value. The comparator can set the second switch control signal such that the second switch is operated, in some examples closed, when the voltage level at the first output reaches the first output threshold level. The threshold value that is compared with the signal representative of the voltage level at the first output by the comparator can account for voltage that is expected to be dropped across any components in the output circuit, such as the output switch/diode.

The second switch controller may be configured to set the second switch control signal such that the second switch is operated, in some examples opened, when the current flowing through the inductor drops to a current threshold value, in this way, the second switch is prepared for a next switching cycle. The current threshold value may be substantially zero, and this can be used for a discontinuous conduction mode of operation (DCM). In other examples, a non-zero current threshold can be used to provide for a boundary or continuous conduction mode (BCM or CCM) of operation.

The second switch controller may include a comparator configured to compare the voltage levels at points either side of a component in the circuit between the inductor and the second output, and cause the second switch to be operated, in some examples opened, when the voltage levels at points either side of the component are the same (DCM) or below certain threshold value (for CCM).

The switching circuit may include a single inductor, which can be advantageous as inductors are known to occupy a large amount of physical space.

The switching circuit may include a power switch controller that is configured to operate the power switch in accordance with the voltage level at the second output.

The switching circuit may include a diode that is connected between ground and an output terminal of the inductor. The anode of the diode may be connected to ground and the cathode of the diode may he connected to the output terminal of the inductor. The diode can prevent the voltage at the output node of the inductor from experiencing a negative voltage after demagnetization that is considered too large. This additional diode can prevent damage to the transistors that are used as part of the second switch controller.

The switching circuit may further comprise one or more further outputs having associated therewith a further switch and a further switch controller. The one or more further switch controllers may be configured to provide the associated further switch with a switch control signal such that power is transferred from the input to the associated further output when the output voltage level of the preceding output reaches an output threshold level. In this way, a switching circuit with any number of outputs can be built up.

The second switch controller may comprise a first transistor that is configured to:
 compare the first output voltage level with the first output threshold level,
 provide the second switch functionality such that current is transferred to the second output when the first output voltage level reaches the first output threshold level, and
 provide part of a latch functionality that is used in operating the second switch; and The second switch controller may further comprise a current mirror consisting of one or two transistors that are configured to conduct current to the second output and mirror a fraction of the current back to the first transistor to set the latch functionality for operating the second switch. The current mirror may also be configured to compare the current to the second output with a threshold level and reset the latch function when the current reaches the threshold level.

Such a second controller can be implemented using relatively few components, which can be considered advantageous as it occupies relatively little physical space.

There may be provided a method of operating a multiple output switching circuit having an input, a first output and a second output, the method comprising:
  providing power from the input to the first output; and
  redirecting the power from the input to the second output when the voltage level at the first output reaches a threshold value.

The step of providing power from the input to the first output may comprise operating, in some examples closing, a power switch of the switching circuit.

The step of redirecting the power from the input to the second output may comprise operating, in some examples closing, a second switch such that current flows to the second output instead of to the first input, The method may further comprise operating, in some examples opening, the power switch in order to start the demagnetization phase of operation.

The method may further comprise operating, in some examples opening, the second switch when the current through the inductor reaches a threshold value. In some examples this threshold value may be zero, and is representative of the end of a demagnetizing phase.

The method may further comprise operating, in some examples closing, the power switch in order to start another switching cycle.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may he a network download, including an internet download.

Figure 2:
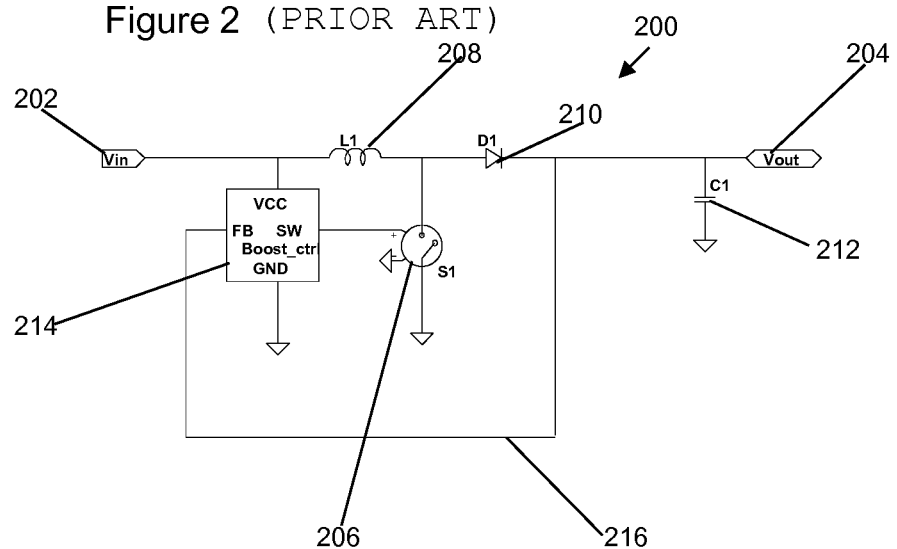
Figure 3:
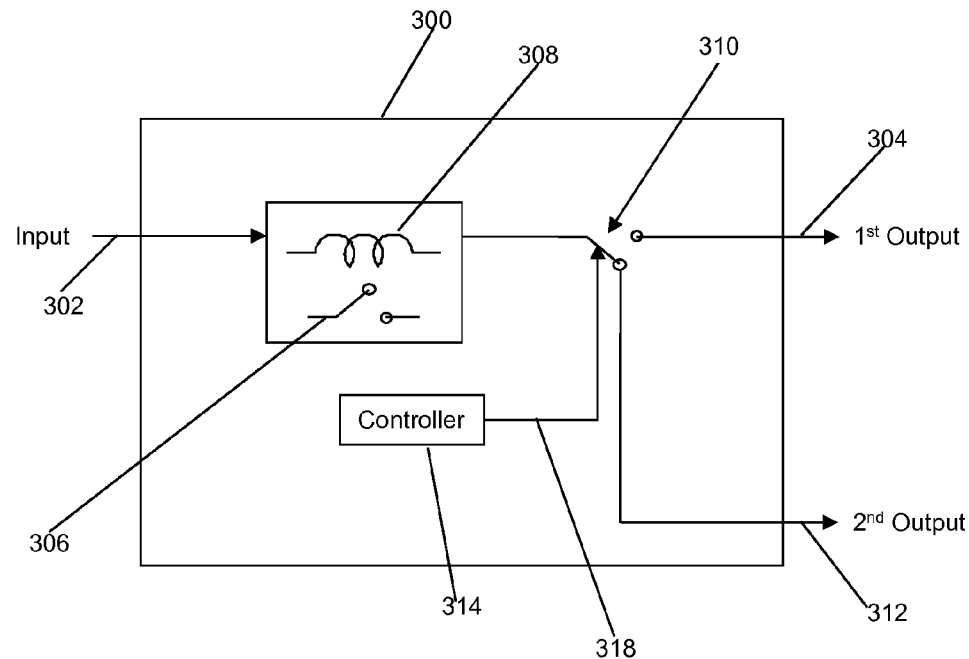
Figure 4:
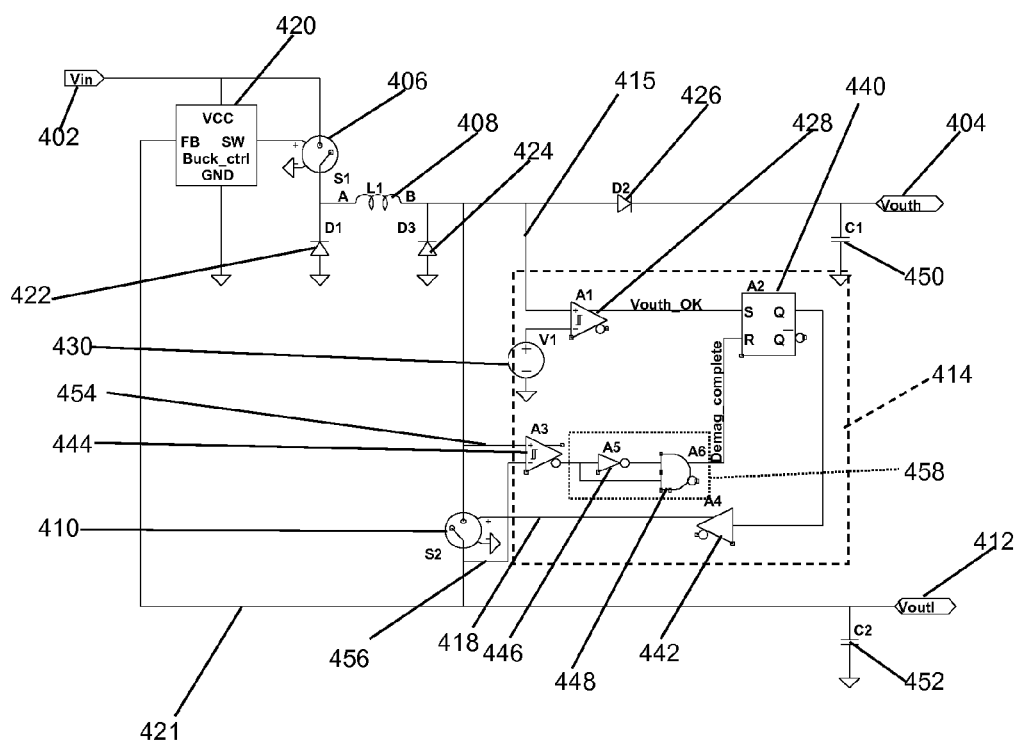
Figure 5:
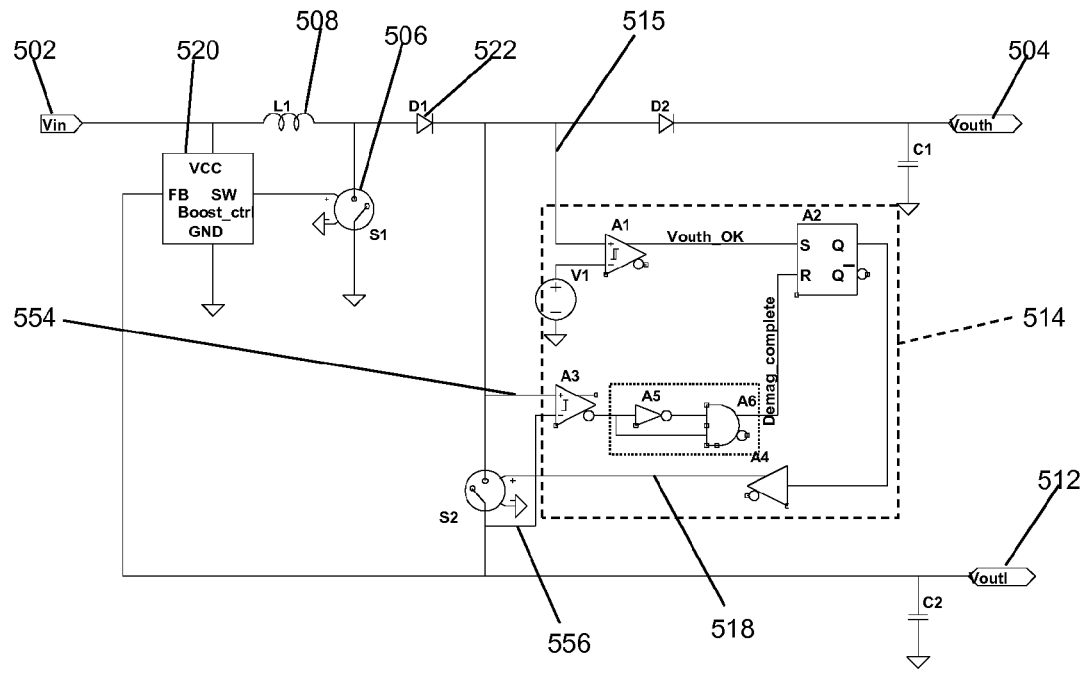
Figure 7:
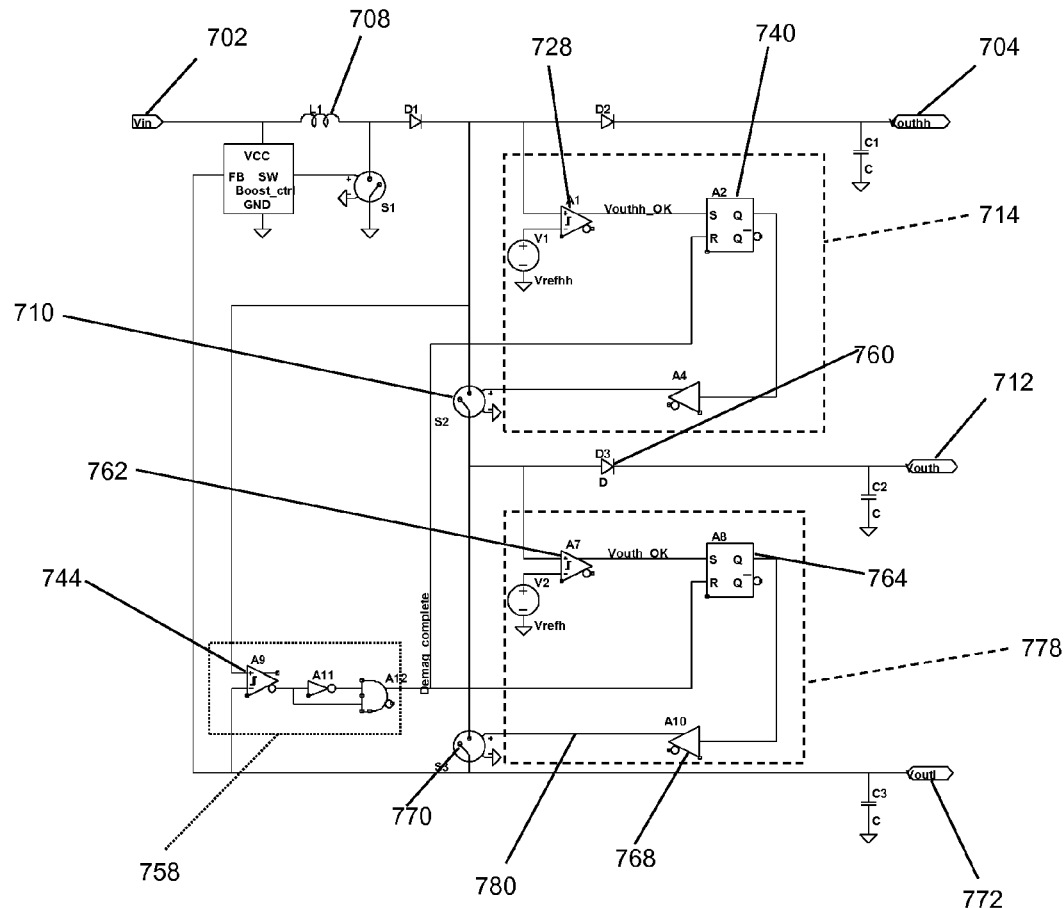
Figure 8:
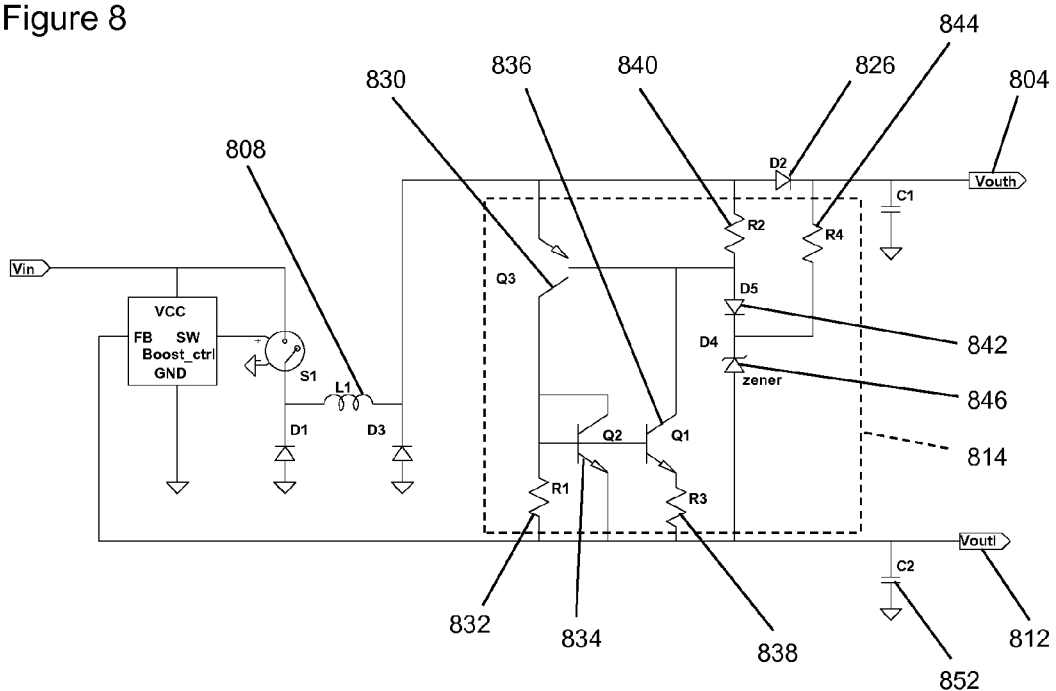
Figure 9:
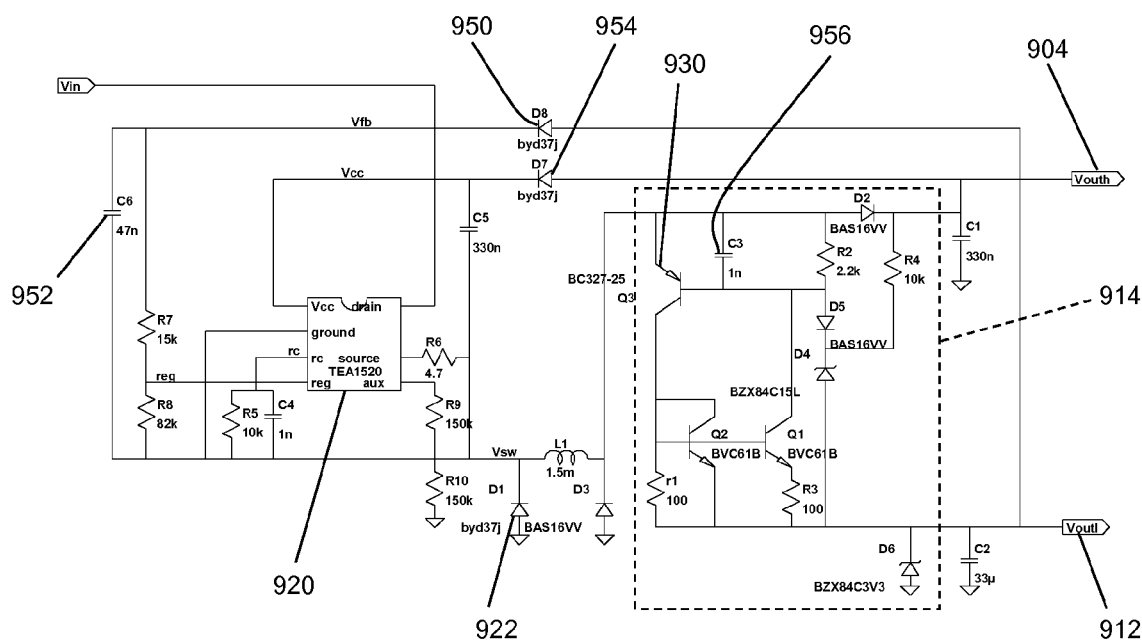

A description is now given, by way of example only, with reference to the accompanying drawings, in which:
  FIG. 1 illustrates a prior art buck converter;
  FIG. 2 illustrates a prior art boost converter;
  FIG. 3 illustrates a switching circuit according to an embodiment of the invention;
  FIG. 4 illustrates a buck converter according to an embodiment of the invention;
  FIG. 5 illustrates a boost converter according to an embodiment of the invention;
  FIG. 8 illustrates a flyback converter according to an embodiment of the invention;
  FIG. 7 illustrates a three-output boost converter according to an embodiment of the invention;
  FIG. 8 illustrates an example implementation of a switching circuit according to an embodiment of the invention; and
  FIG. 9 illustrates an example implementation of a switching circuit according to an embodiment of the invention.

One or more embodiments of the invention relate to a multiple output switching circuit having an input configured to receive power from a power source, a first output configured to provide a first output voltage, and a second output configured to provide a second output voltage. The circuit also includes a second switch (in addition to a known power switch that is present in switching circuits) that is coupled between the first output and the second output and is operable such that power is transferred from the input to the second output when the first output voltage level reaches a first output threshold level. Such a circuit can provide a convenient way for expanding the functionality of known single output switching circuits to provide one or more additional outputs without requiring an additional inductor or extra energy-dissipating components, as may be known in the art.

FIG. 1 illustrates a prior art buck converter 100. The buck converter has an input 102 for receiving an input voltage from a power source, and an output 104 for providing an output voltage. Connected in series between the input 102 and the output 104 are a power switch S1 106 and an inductor L1 108. Connected between ground and the node between the power switch S1 106 and the inductor L1 108 is a diode D1 110. The anode of the diode D1 110 is connected to ground, and the cathode of the diode D1 110 is connected to the power switch 106 and the inductor 108. A capacitor C1 112 is connected between the output 104 and ground.

A controller 114 is used to operate the power switch S1 106 in accordance with a sensed output voltage level that is provided as feedback signal (FB) 116 to the controller 114. In this way, the converter 100 can be regulated to provide a desired output level.

When the controller 114 closes the switch S1 106 to increase the current through the inductor L1 108, additional charge is supplied to the output capacitor C1 112. This is known as a magnetization phase of operation. Depending upon the mode of operation that is being employed, the controller 114 can open the power switch S1 106 after a predefined time (on-time control) or when the inductor current reaches a predefined level (peak current control) as determined from the feedback signal 116.

After the power switch S1 106 has been opened, the current through the inductor L1 108 will flow via the diode D1 110, and will gradually decrease. This is known as a demagnetization phase. Depending upon the mode of operation that is being employed, the controller 114 can close the power switch S1 106 for the next cycle when the inductor current reaches a predefined level (continuous conduction mode (CCM)) or after the inductor current has fallen to zero (discontinuous conduction mode (DCM)). DCM may involve waiting for a certain back-off time before starting the next switching cycle.

For a buck converter, charge is supplied to the output capacitor C1 112 during both the magnetization and demagnetization phases.

FIG. 2 illustrates a prior art boost converter 200. The boost converter has an input 202 for receiving an input voltage from a power source, and an output 204 for providing an output voltage. Connected in series between the input 202 and the output 204 are an inductor L1 208 and a diode D1 210. The anode of the diode D1 210 is connected to the inductor L1 208, and the cathode of the diode D1 210 is connected to the output 204. Connected between ground and the node between the inductor L1 208 and the diode D1 210 is a power switch 206. A capacitor C1 212 is connected between the output 204 and ground.

A controller 214 is used to operate the power switch Si 206 in accordance with a sensed output voltage level that is provided as feedback signal (FB) 216 to the controller 214. In this way, the converter 200 can be regulated to provide a desired output level.

When the controller 214 closes the switch S1 206 to increase the current through the inductor L 208, the charge on the output capacitor C1 212 decreases as the capacitor discharges to the output 204. This is known as a magnetization phase of operation. Depending upon the mode of operation that is being employed, the controller 214 can open the power switch S1 206 after a predefined time (on-time, control) or when the inductor current reaches a predefined level (peak current control) as determined from the feedback signal 216.

After the power switch S1 206 has been opened, the current through the inductor L1 208 will flow via the diode D1 210 to the output 204, and the charge stored on the output capacitor C1 212 will gradually increase. During this phase, the inductor current decreases. This is known as the demagnetization phase.

The boost converter 200 can be operated in discontinuous conduction mode (DCM) or continuous conduction mode (CCM) in the same way as described with reference to the buck converter.

For a boost converter, charge is supplied to the output capacitor C1 212 only during the demagnetization phase.

FIG. 3 illustrates a switching circuit 300 according to an embodiment of the invention. The switching circuit 300 includes an input 302 for receiving power from a power source (not shown), a first output 304 for providing a first output voltage and a second output 312 for providing a second output voltage. It can be advantageous to provide different output voltage levels from a single switching circuit 300 that is used in applications that have a plurality of components or circuits that have different operating voltage levels.

The switching circuit 300 includes a power switch 306 and an inductor 308 connected between the input 302 and the output 304. The power switch 306 and the inductor 308 can be arranged in any known way such that power is transferred from the input 302 to the output 304. For example, the power switch 306 and the inductor 308 can be arranged to provide a buck converter or a boost converter. Alternatively, the inductor 308 could be part of a transformer and a flyback converter could be provided, A second switch 310 is coupled between the first output 304 and the second output 312. The second switch 310 may be coupled either directly or indirectly to the first output 304 or the second output 312. In this example, the second switch 310 connects the input 302 (indirectly via the power switch 306 and/or inductor 308) to the first output 304 when it is in a first position, and to the second output 312 when the second switch 310 is in a second position.

In some examples, additional components may be required between the second switch 310 and either or both of the outputs 304, 312 such that current does not flow directly between the two outputs 304, 312. Further details of such an example are provided below whereby a diode (or a controlled switch) is located in series between the second switch and the first output.

The switching circuit 300 also includes a second switch controller 314 that provides the second switch 310 with a switch control signal 318. The switch control signal 318 can operate the second switch 310 such that power is transferred from the input 302 to the second output 312 when the voltage at the first output 304 reaches a threshold value. In this way, all, or substantially all, of the input power can he passed to the second output 312 instead of the first output once the voltage level at the first output 304 reaches an intended value.

FIG. 4 illustrates a switching circuit according to an embodiment of the invention that operates as a dual output buck converter. The switching circuit has an input 402, a first output 404 and a second output 412. In this example, the first output 404 provides an output voltage level that is higher than the voltage level at the second output 412, although this need not necessarily be the case.

The following components of a single output buck converter operate in the same way as that described with reference to FIG. 1, and will not be explained again here: power switch controller 420, power switch 408, diode D1 422, and inductor L1 408.

It will be appreciated that any components that are described herein as being coupled or connected could be directly or indirectly coupled or connected. That is, one or more components could be located between two components that are said to be coupled or connected whilst skill enabling the required functionality to be achieved.

The switching circuit of FIG. 4 includes a first output diode D2 426 connected in series between the inductor 408 and the first output 404. The anode of the first output diode D2 426 is coupled to the inductor 408 and the cathode of the first output diode D2 426 is coupled to the first output 404. As will be appreciated from the description that follows, the first output diode D2 426 is used to prevent current flowing from the first output 404 to the second output 412 when power from the input 402 is being used to charge an output capacitor C2 452 at the second output 412.

A second switch 410 is provided between the anode of the first output diode D2 426 and the second output 412. The second switch 410 is operated by a switch control signal 418 from a second switch controller 414.

A new magnetization phase of a switching cycle begins when the power switch S1 406 is closed and the inductor current increases. The second switch S2 410 is initially open (that is, in a non-conducting state) at the start of the magnetization phase. In the same way as discussed above, the current thorough the inductor L1 408 will gradually ramp-up and charge the first output capacitor C1 450.

The second switch controller 414 has an input 415 that is coupled to the anode of the first output diode D2 426 in order to provide the second switch controller 414 with an input signal representative of the voltage level at the first output 404. The input signal 415 is provided to a first input of a comparator A1 428. The second input of the comparator A1 428 is connected to a voltage source V1 430 that provides a fixed voltage level indicative of a threshold level at which the first output 404 has reached its desired value. In this example, the pre-defined threshold voltage of comparator A2 428 is the target output voltage for the first output 404 plus the voltage drop across the forward conducting first output diode D2 426.

In this embodiment the comparator A1 428 is provided as a Schmitt trigger so that the output of the comparator A1 428 is free from glitches.

The output of the comparator A1 428 is connected to the set input of a latch 440. The Q output of the latch 440 is used to control the second switch S2 410 via driver amplifier A4 442. These components of the second switch controller 414 are used to provide the second switch S2 410 with a switch control signal 418 such that the second switch S2 410 is closed when the voltage level at the first output 404 reaches a desired value.

When the second switch S2 410 is dosed, the current through the inductor L1 408 will flow to the second output 412 and charge the second output capacitor C2 452 instead of flowing to the first output 404. In addition, no current can flow from the first output 404 to the second output due to the first output diode D2 426.

The second switch controller 414 has an input 454, 456 that is configured to receive signals 454, 456 representative of the voltage at two different points in the circuit between the inductor L1 408 and the second output 412. In this embodiment, the second switch controller 414 receives a signal 454 from a first terminal of the second switch S2 410 and a signal 456 from a second terminal of the second switch S2 410 such that the difference between the two signals 454, 456 represents the voltage dropped across the second switch S2 410. It will he appreciated that the voltage dropped across the second switch S2 410 is representative of the current through the inductor L1 408 when power is being provided to the second output 412. These two inputs 454, 456 are provided as inputs to a comparator A3 444. In this way, the output of the comparator A3 444 is set when the two inputs 454, 456 are equal and therefore no voltage is dropped across the second switch S2 410. In this example therefore, the output of the comparator A3 444 is set when there is zero or very little current flowing through the inductor L1 408.

The output of the comparator A3 444 is provided as an input to a pulse generator 458. The pulse generator 458 in this example includes a NOT gate A5 446 and an AND gate A6 448. The pulse generator 458 provides a pulse with a duration equal to the propagation delay of the NOT gate A5 446 when the output of the comparator A3 444 transitions from low to high. The output of the pulse generator 458 is provided to the reset input of the latch 440. In this way, the switch control signal 418 that is provided by the latch 440 causes the second switch S2 410 to be opened when there is zero current in the inductor L1 408. The circuit is then ready for a new magnetization phase of the next switching cycle.

The power switch controller 420 regulates the voltage level at the second output 412 using the feedback signal 421 in order to open the power switch S1 406 after an appropriate magnetization time and start a demagnetization phase such that the current through the inductor L1 408 decreases. The power switch controller 420 then causes the power switch S1 406 to be closed, thereby starting a new magnetization phase, in accordance with an appropriate control algorithm. Examples of such a control algorithm include on-time control and peak current control.

It will be appreciated that the second switch controller 414 described above is suitable for use with a switching circuit that is operated in a discontinuous conduction mode (DCM) of operation as the second switch S2 410 is only opened when the inductor current is zero. In other embodiments, continuous conduction mode (CCM) or boundary conduction mode (BCM) of the switching circuit can be used. The signals 454 and 456 could be processed by the second switch controller 414 such that the second switch S2 410 is opened at the same time as the power switch 406 is closed so that the circuit is in an appropriate skate at the start of a new magnetization phase.

The circuit of FIG. 4 also includes an optional diode D3 424 that is connected between ground and the terminal of the inductor L1 408 that is not connected to the power switch 406. The anode of the diode D3 424 is connected to ground and the cathode of the diode is connected to the inductor L1 408. The diode D3 424 can prevent the voltage at the output node of the inductor L1 408 from experiencing a negative voltage after demagnetization that is considered too large. This may otherwise happen due to a delay in demagnetization detection and recovery charge from diode D1 422 that may result in reversing of the inductor current after demagnetization. This additional diode D3 424 can prevent damage to the transistors that are used to implement the component blocks of FIG. 4 due to high reverse voltages across junctions.

It will be appreciated that a controlled switch could be used instead of any of the diodes disclosed herein. Such switches can be controlled such that they are closed when the diode would have been forward biased, and open when the diode would have been reverse biased. An example of a suitable switch is a MOSFET.

FIG. 5 illustrates a switching circuit according to an embodiment of the invention that operates as a dual output boost converter. The power switch controller 520, inductor L1 508, diode D1 522 and power switch 506 are arranged in the same way as hu/the prior art boost converter that is discussed above in relation to FIG. 2.

The switching circuit has an input 502, a first output 504, a second output 512 and second switch controller 514 that are similar to the corresponding components of FIG. 4.

Figure 6:
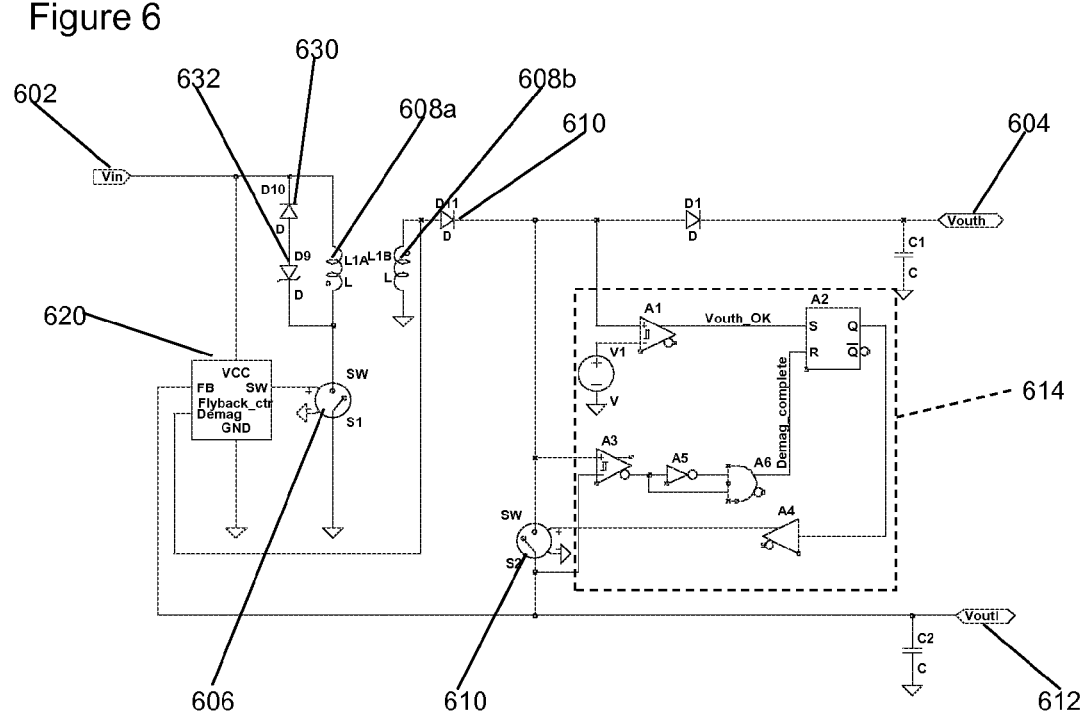

FIG. 6 illustrates a switching circuit according to an embodiment of the invention that operates as a dual output flyback converter. The circuit includes a power switch controller 620, a primary winding/inductor L1A 608*a* and a secondary winding/inductor L1B 608*b* that together form a transformer, a diode D11 610 and a power switch 606 that are arranged in order to provide a known flyback converter, The switching circuit has an input 602, a first output 604, a second output 612 and second switch controller 614 that are similar to the corresponding components of FIGS. 4 and 5.

During magnetization, the power switch S1 606 is closed so the current through the primary winding L1A 608*a* increases until the start of demagnetization. During demagnetization, the power switch S1 606 is open and current will be transferred through the diode D11 610. Diodes D9 632 and D10 630 are provided in series across the primary winding L1A 608*a* and can prevent a peak voltage after opening the power switch S1 606 that would occur as a consequence of leakage inductance. This is well known in flyback converters, and in some examples a resistor-capacitor (RC) network or resistor-capacitor-diode (RCD) network can used instead of the two diodes D9 632, D10 630.

In some embodiments, the detection of the demagnetization phase may be used to open the second switch 610 in addition to be used by the flyback power switch controller 620. A known Demag pin of the flyback power switch controller 620 is shown in FIG. 6, FIGS. 5 and 6 are illustrative of the fact that the functionality provided by embodiments of the invention can be applied to different types of known switching circuits, power factor correction (PFC) circuits and switched mode power supplies (SMPSs).

Embodiments of the invention are not limited to dual output converters, and can be provided as or with converters that provide any number of a plurality of outputs. As an example. FIG. 7 shows the topology extended to a three-output boost converter. The principle of operation is the same as for two outputs as described in relation to FIG. 4.

The switching circuit of FIG. 7 includes an input 702, a first output 704, a second output 712, and elements of the second switch controller 714 that are similar to the corresponding components of FIG. 4. In addition, the circuit of FIG. 7 includes a third output 772, an additional third switch S3 770, and a second output diode D3 760 that prevents current from flowing from the second output 712 to the third output 772 when power is being transferred from the input 702 to the third output 772, A third switch S3 770 is provided in series between the second switch S2 710 and the third output 772. The third switch S3 770 is open at the start of a magnetization phase, and is closed when the second output voltage 712 reaches a desired value. The third switch S3 is operated by a switch control signal 780 from a third switch controller 778 that is similar to the second switch controller 714. In this example, the pulse generator 758 that is used to reset the second switch S2 710 can also be used to reset the third switch S3 770. That is, a single set of components can be used for resetting the latches 740, 764 of both the second and third switch controllers 714, 778.

For more than two outputs, a single demagnetization detection can be sufficient. The demagnetization can be detected by sensing across the series of second switch S2 710 and third switch S3 770. However, in other embodiments the voltage across any one or more of the components that are in series with the inductor L1 708 and the third output 772 can be used to detect the end of the demagnetization phase or any appropriate time at which a next switching cycle should be started.

While the inductor L1 708 conducts current (during the magnetization phase followed by demagnetization), the inductor current will supply the first output 704 until comparator A1 728 detects that the first output 704 has reached its target level. The output of the comparator A1 728 then sets the latch A2 740. As a result, the second switch S2 710 will be closed such that the inductor current will supply the second output 712. The supply of the second output 712 will continue until comparator A7 762 detects that the second output 712 has also reached its target output voltage. The output of comparator A7 762 will then set latch A8 764 such that driver A10 768 will close the third switch S3 770. For the remaining part of the cycle, the current will be supplied to the third output 772.

In this example, the first output 704 is set to a higher voltage level than the second output 712, and the second output 712 is set to a higher voltage level than the third output 772.

FIG. 8 illustrates an example implementation of the buck converter switching circuit of FIG. 4. The second switch controller 814, which also includes the second switch, is implemented using relatively few components and this can be advantageous in some embodiments as the controller 814 does not occupy a large amount of physical space.

The second switch controller 814 includes a pnp bipolar junction transistor (BJT) Q3 830. The emitter of the pnp BJT 830 is connected to the node between the inductor L1 808 and first output diode D2 826. The collector of the pnp BJT 830 is connected to a first terminal of a resistor R1 832. A second terminal of the resistor R1 832 is connected to the second output 812.

The second switch controller 814 includes a second npn BJT Q2 834 and a first npn BJT Q1 836. The collector of the pnp BJT 830 is also connected to the base and collector of the second npn BJT 834, as well as to the base of the first npn BJT 836. The emitter of the second npn BJT is connected to the second output 812. The collector of the first npn BJT 836 is connected to the base of the pnp BJT 830. The emitter of the first npn BJT 836 is connected to a first terminal of a resistor R3 838. The second terminal of the resistor R3 838 is connected to the second output 812.

The second switch controller 814 also includes a resistor R2 840 that has a first terminal connected to the node between the inductor L1 808 and first output diode D2 826, and a second terminal connected to the base of the pnp BJT 830. The second terminal of the resistor R2 840 is also connected to the anode of a diode D5 842. The cathode of the diode D5 842 is connected to the first terminal of a resistor R4 844. The second terminal of the resistor R4 844 is connected to the cathode of the first output diode D2 826. The cathode of the diode D5 842 is also connected to the cathode of a Zener diode D4 846. The anode of the Zener diode D4 846 in this example is connected to the second output 812. In other examples, the anode of the Zener diode D4 846 can be connected to ground.

It will be appreciated that the circuit of FIG. 8 could also be built using complementary transistors; that is, the P-type transistors could be replaced with N-type transistors, and vice-versa. In further embodiments still, the circuit of FIG. 8 could be built using metal oxide semiconductor (MOS) transistors instead of BJTs.

The pnp BJT Q3 830 in this example performs three functions. The first function is the compare function to determine when the first output 804 has reached a threshold value, and the voltage threshold is provided by the Zener diode D4 846. This functionality is equivalent to the comparator A1 428 in FIG. 4.

The second function of the pnp BJT Q3 830 is the second switch function to direct the inductor current to the second output 812 once the threshold level at the first output 804 has been met. This functionality is equivalent to the second switch S2 410 of FIG. 4.

The third function of the pnp BJT Q3 830 provides part of the positive-feedback loop that performs the latch function for operating the second switch correctly. This functionality is equivalent to the latch A2 440 in FIG. 4. The loop for the latch function is further completed by the two npn BJTs 834, 836: The majority of the current from the pnp BJT Q3 830 flows through the second npn BJT Q2 834, while a fraction for the current is mirrored via current mirror (provided by both npn BJTs 834, 836) to the base of the pnp BJT Q3 830 in order to keep the latch function.

Resistor R1 832 and second npn BJT Q2 836 enable the second switch to be reset for a subsequent switching cycle. This functionality is equivalent to the reset comparator A3 444 of FIG. 4. If the current from the pnp BJT Q3 830 is no longer sufficient to keep the base-emitter voltage of the second npn BJT Q2 834 across resistor R1 832, then the current from the first npn BJT Q1 836 will drop below the current that is required to keep the pnp BJT Q3 830 conducting, and therefore the latch function will be reset. The resistor R2 840 will cut-off the current through the pnp BJT Q3 830. It should be noted that the value of resistor R1 832 should not be too low as this would result into a too early reset, thereby causing an additional supply of current from the inductor to the first output 804.

The diode D5 842 and resistor R4 844 are included in order to keep the Zener reference diode D4 846 biased. This can prevent the latch from triggering too early due to charging of the Zener diode.

FIG. 9 illustrates an example implementation of a switching circuit according to an embodiment of the invention. The circuit of FIG. 9 uses a second switch controller 914 that is similar to the second switch controller of FIG. 8. FIG. 9 also uses the NXP TEA1520 IC 920 in Buck topology. The application description of this converter IC is commonly available. The power/buck switch is integrated in the IC 920, between the drain and source terminals of the IC 920.

In this specific example, the Buck controller 920 refers to the source terminal of the switching transistor as ground. As a result, the ground reference of the Buck controller makes a large voltage swing. For this reason, the feedback from the second output 912 to the Buck controller 920 includes a diode D8 950 that copies the second output voltage 912 into capacitor C6 952 during the demagnetization phase (that is, when the inductor current flows through D1 922).

The circuit of FIG. 9 includes a diode D7 954 between the first output 904 and the Vcc voltage supply of the Buck controller 920. This diode D7 954 is optional and has been added in order to supply the Buck control IC with the output voltage rather than via a bleeder from mains. (The bleeder will only be active during start-up). This can save power consumption.

An additional capacitor C3 956 is included between the emitter and the base of the pnp BJT Q3 930 in this example. The additional capacitor C3 956 can prevent the latch from triggering on high dV/dt and can limit the peak current through the pnp BJT Q3 930 when it starts conducting.

In this example, the component selection of the switch controller 914 for the second output 912 has been made such that a low/minimum number of surface mounted devices (SMDs) are required. Transistors Q1 and Q2 can be available as a single SMD device. The diodes D3, D2 and D5 can also be available as a single SMD.

One or more embodiments disclosed herein can be considered as advantageous over the prior art as relatively simple additional circuitry is required, only a single inductor is needed, and an efficient switching circuit can be achieved as the introduction of components that dissipate a large amount of energy can be avoided.

For example, embodiments of the invention can avoid the use of additional low drop-out regulators (LDOs) for deriving additional (lower) output voltages, thereby avoiding the low power efficiency that can be associated with such components.

Embodiments of the invention can also avoid the use of pulse width modulation (PWM) control to divide an inductor current between multiple outputs. Such control can be complicated, and require a high number of components.

Embodiments of the invention have been borne out of a desire for a simple controller that consists of relatively few inexpensive components, and that can be used as an extension of a single output Buck. Boost or Flyback converter. Integrated switching regulators generally do not use high-density CMOS processes, and therefore a simple solution can be considered as beneficial for both discrete solutions and also for integrated circuits One or more embodiments disclosed herein can provide a compact and low-cost solution that can be added to a traditional Buck. Boost or Fly-back converter in order to derive two output voltages without adding an additional inductor. In the first part of the magnetization and possibly demagnetization phase (for Buck converters) or demagnetization phase (for Boost or Flyback converters), the inductor output current is supplied to the highest output voltage. As soon as the highest output voltage exceeds a predefined threshold voltage, the inductor output current is further supplied to the lower output voltage until demagnetization is completed. The Buck, Boost or Fly-back controller regulates the lower output voltage. The circuitry to drive the switches between the inductor and outputs can be implemented using very few components. It is possible to extend the solution to more than two output voltages.

Embodiments described herein can relate to a Buck, Boost or Flyback converter that generates two or more output voltages using a single inductor. A novel aspect in some embodiments is the way switches are controlled. A very simple circuit can be used to control the switches in some embodiments of the invention.

One or more embodiments may relate to a multiple output Buck. Boost or Flyback converter comprising
 a single inductor
 switches ((MOS)FETs, bipolar transistors or diodes)
 one or more inputs
 two or more outputs
 a conventional Buck. Boost or Flyback controller that regulates one of the outputs
 an additional switch controller that regulates one or more additional outputs.

The switch controller may consist of:
 A voltage comparator for comparing the voltage at the output inductor terminal to a reference voltage
 A voltage or current comparator that detects the end of the inductor demagnetization (completion of a cycle in DCM), or detects a point in the demagnetization phase at which one or more additional switches should be operated so as to provide BCM or CCM operation.
 A memory element that is set when the momentary voltage of the output inductor terminal exceeds the reference voltage and reset after detection of demagnetization The switch controller may drive the switch between the output inductor terminal and the lowest output. The switch controller may drive the switch between the output inductor terminal and the highest output.

The converter may be extended to three or more outputs,
The switch controller may be implemented as follows:
 A first bipolar or MOS transistor serving purpose of voltage comparator as well as current switch as well as amplifier in the latch.
 A current mirror consisting of one or two bipolar or MOS transistors that conducts the switched current to the additional output and that mirrors a faction of the switch current back to the first transistor to establish the latch function.
 The mentioned current-mirror that as a third function detects the switch current to drop below certain threshold level and stops the latch function.

The switch controller may be implemented by using complementary transistors (so replace N-type by P-type and vice-versa).

The voltage reference for additional output can be referred to ground or to the lower output voltage.

A diode can be inserted between the base terminal of the first transistor (acting as voltage comparator) and the reference voltage source, in order to prevent poor performance due to fact that the reference voltage needs to be built up at each new magnetization cycle.

The invention claimed is:
1. A multiple output switching circuit comprising:
 an input configured to receive power from a power source;
 a first output configured to provide a first output voltage;
 an inductor and a power switch connected between the input and first output;
 wherein the power switch is operable to transfer power from the input to the first output;
 a second output configured to provide a second output voltage;
 a second switch coupled between the first output and the second output; and
 a second switch controller configured to provide the second switch with a second switch control signal such that power is transferred from the input to the second output when the first output voltage level reaches a first output threshold level;
 wherein the second switch controller comprises:
 a first transistor that is configured to:
  compare the first output voltage level with the first output threshold level,
  provide the second switch functionality such that current is transferred to the second output when the first output voltage level reaches the first output threshold level; and
  provide part of a latch functionality that is used in operating the second switch; and a current mirror consisting of one or two transistors that are configured to conduct current to the second output and mirror a fraction of the current back to the first transistor to set the latch functionality for operating the second switch;

wherein the current mirror is also configured to compare the current to the second output with a threshold level and reset the latch function when the current reaches the threshold level.

2. The switching circuit of claim 1, wherein the switching circuit is one of a boost converter, a buck converter and a flyback converter.

3. The switching circuit of claim 1, further comprising a first output switch that is connected between the first output and the second switch in order to prevent current from flowing from the first output to the second output when the second switch is closed.

4. The switching circuit of claim 1, wherein the second switch controller comprises a comparator configured to compare a signal representative of the voltage level at the first output with a threshold value, and set the second switch control signal such that the second switch is operated when the voltage level at the first output reaches the first output threshold level.

5. The switching circuit of claim 1, wherein the second switch controller is configured to set the second switch control signal such that the second switch is operated when the current flowing through the inductor drops to a current threshold value.

6. The switching circuit of claim 5, wherein the current threshold value is substantially zero.

7. The switching circuit of claim 5, wherein the current threshold value is non-zero in order to operate the switching circuit in a continuous conduction mode of operation.

8. The switching circuit of claim 1, wherein the switching circuit includes a single inductor.

9. The switching circuit of claim 1, wherein the switching circuit includes a power switch controller that is configured to operate the power switch in accordance with the voltage level at the second output.

10. The switching circuit of claim 1, further comprising a diode connected between ground and an output terminal of the inductor, the diode having an anode and a cathode, wherein the anode of the diode is connected to ground and the cathode of the diode is connected to the output terminal of the inductor.

11. The switching circuit of claim 1, further comprising:
at least one further output having associated therewith a further switch and a further switch controller;
wherein the one or more further switch controllers are configured to provide the associated further switch with a switch control signal such that power is transferred from the input to the associated further output when the output voltage level of the preceding output reaches an output threshold level.

\* \* \* \* \*